Dec. 4, 1962  R. S. BUCK  3,066,480
RAMJET MISSILE
Filed Jan. 13, 1954
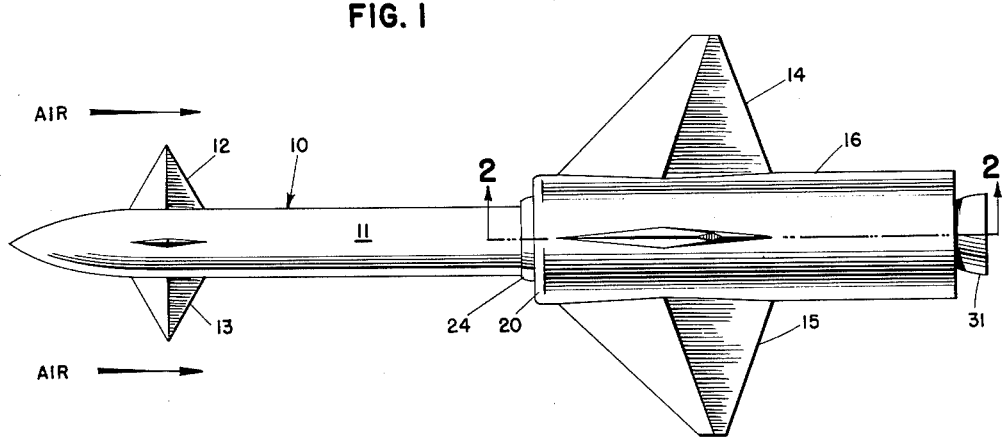
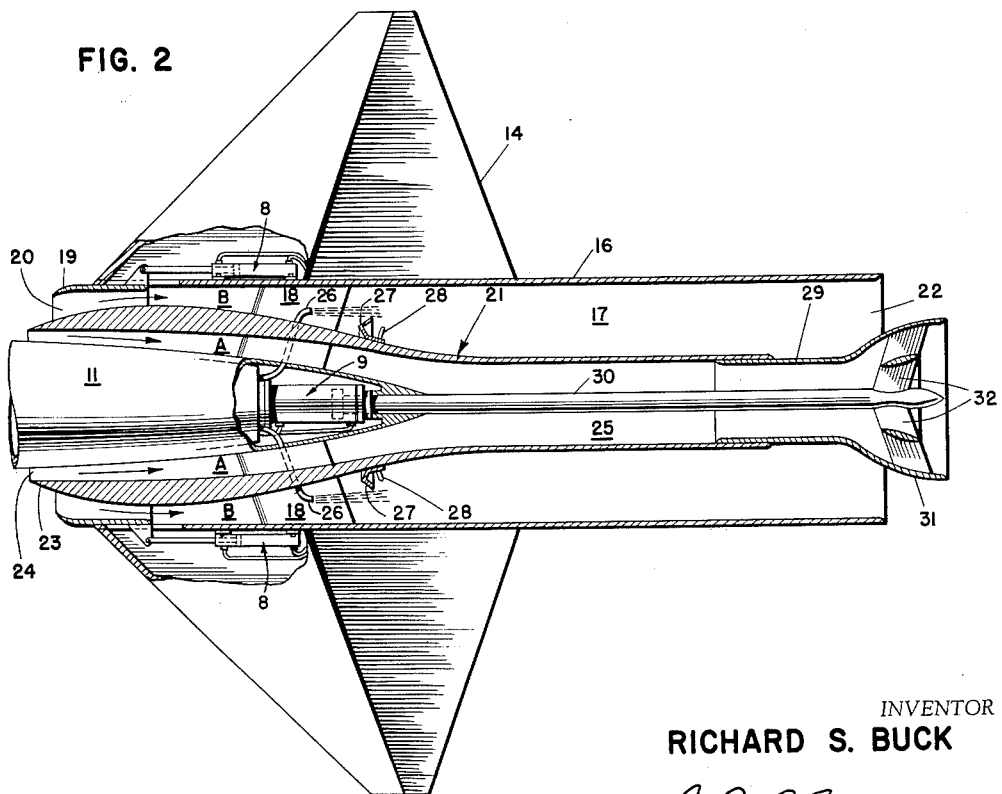
INVENTOR
RICHARD S. BUCK
BY
ATTORNEYS – Patented Dec. 4, 1962

3,066,480
RAMJET MISSILE
Richard S. Buck, Glastonbury, Conn., assignor, by mesne assignments, to the United States of America as represented by the Secretary of the Navy
Filed Jan. 13, 1954, Ser. No. 403,939
3 Claims. (Cl. 60—35.6)

The present invention relates to ramjet engines and more particularly to combustion chambers for ramjet engines.

In jet propulsion devices the inlet air provided for the combustion cycle is admitted into the combustion chamber indiscriminately, that is, air enters the combustion chamber without regard as to whether it is of a low or of a high energy level. The distinction of energy levels being considered as the difference in kinetic energy of a fluid layer which adheres or is contiguous with a body traveling through space and has an appreciably lower relative kinetic energy than a fluid layer spaced a reasonable distance from the flight borne body which latter layer will be unimpeded by the surface effects of the body. Failing to segregate the inlet air mass before entry into the combustion chamber results in an appreciably lowered combustion cycle efficiency. In addition to the increased fuel consumption required to attain the desired flight results at lowered operating efficiency, increased temperatures in the critical zone necessitate the use of costly metals and ceramics for the combustion chambers unless some means for cooling the chamber walls is provided.

Therefore it is an object of this invention to provide means for segregating inlet ramjet air for combustion.

Another object of this invention is to provide a means for controlling the combustion air inlet so as to divert a boundary air layer of low energy level from the combustion chamber.

Still another object of the invention is to provide a combustion chamber for a ramjet engine in which the interior walls are supplied with a cooling medium.

Another object of this invention is to provide a ramjet with a variable inlet orifice for a portion of the inlet air mass and a variable orifice for the exhaust products.

Another object is to provide a diverter capable of reducing characteristic pressure vibrations of the structural interior of a combustion chamber for a ramjet engine.

Other objects and many of the attendant advantages of this invention will be readily appreciated as the same becomes better understood by reference to the following detailed description when considered in connection with the accompanying drawings wherein:

FIG. 1 is a longitudinal side elevation of a ramjet missile incorporating one embodiment of the present invention; and FIG. 2 is an enlarged partial longitudinal sectional view of the combustion chamber taken substantially along the plane of line 2—2 of FIG. 1;

Referring now to the drawings, there is illustrated in FIG. 1 a ramjet missile 10 in which a nacelle or fuselage 11 is provided with forward flight stabilizing surfaces 12, 13 and after flight stabilizing surfaces 14, 15. The after surfaces 14, 15 are mounted on a hollow shroud or cylindrical duct 16 which may be spaced from the ramjet fuselage as illustrated in the enlarged sectional view of FIG. 2. As there shown the duct 16 forming the outer wall for a combustion chamber 17 is circumferentially spaced from the after section of the fuselage of the ramjet by radially projecting struts 18. The leading edge of the shroud or duct 16 may form an inlet baffle member 19 with the requisite curvature to provide a convenient means for controlling the volume or flow of inlet air into the after section of fuselage. Such control means may for example include pneumatic or hydraulic mechanisms 8 which are adapted to impart longitudinal movement to the baffle member 19.

Circumferentially spaced from the ramjet fuselage and spaced intermediate the inlet orifice is an elongated funnel like airfoil diverter 21 which surrounds the tail portion of the ramjet and extends from a position slightly upstream from the leading edge of the baffle member 19 rearwardly within the duct 16 to a position within the proximity of the exhaust orifice 22. The duct supporting struts 18 also provide a stable mounting for the diverter tube 21. Thus by selectively spacing the inner periphery of the leading edge 23 of the diverter tube 21 from the tapering tail portion of the ramjet fuselage and maintaining the diverter concentric with the shroud 16, the annular cavity formed between the shroud 16 and fuselage 11 is divided into an outer chamber 17, designated as the combustion chamber having an outer inlet air orifice 20, and an inner chamber or central core 25 having an inner inlet air orifice 24. The central core 25, initially an annular cavity at the inlet orifice 24 formed between the fuselage 11 and diverter 21, is constricted downstream and extends uniformly beyond the fuselage through the duct.

During flight an entering air mass will be divided into two separate distinct strata or layers A and B. Layer A is formed adjacent the ramjet body and consists of a boundary layer of low energy air which clings closely to the fuselage and is confined within the annular orifice 24 and will flow through the internal core 25 providing a cooling effect for the walls of the diverter within the combustion zone. The remainder of the entering air mass, formed beyond the outer periphery of the leading edge 23 of the diverter 21 and within the leading edge of the adjustable baffle 19, consists of a layer of air of relatively high kinetic energy, designated as layer B, which is skimmed off and segregated from the low energy layer A and flows rearwardly into the combustion chamber 17.

Fuel stored within the fuselage is piped by suitable conduit means through the inner annular cavity to the fuel nozzles 26 spaced on the periphery of the diverter 21 to be commingled with the air of layer B to form the combustible mixture. A gutter or shielded type of flame holder 27 and a shielded pilot burner 28 are rearwardly spaced downstream from the nozzles 26 to maintain the requisite flame stability during flight.

Extending from the rear portion of the diverter tube 21 is a flared exhaust shroud 29 which is axially adjustable by suitable means such as the pneumatic or hydraulic mechanism 9 to telescope within the diverter tube 21. A longitudinal rod 30 axially projecting from within the tail section of the ramjet fuselage provides for the requisite stability of the trailing shroud 29 through struts 32 and which rod may be coupled with the pneumatic or hydraulic mechanism 9 for axially moving the rod 30. By axially moving the flared section 31 of the shroud 29 with respect to the end of the duct 16, a wide range of orirfice exhaust conditions is provided. Therefore by correlating the adjustable orifice inlet baffle 19 with the opening in the exhaust orifice 22 and the rate of burning in the combustion cycle, the optimum flight conditions may be achieved.

By providing a diverter of the type shown for dividing the inlet air mass into distinct zones or layers separated from each other, a central core of low energy air will be supplied which will flow continuously through the center of the combustion chamber to cool the interior wall 21 of the combustion chamber 17 below the conventional critically high operating temperatures. In addition, an appreciably more efficient combustion cycle results from the use of the higher energy level air mass in the combustion chamber.

Conventional pulsations of various frequencies encountered in most ramjet burners is appreciably reduced by providing the structural elements in the present invention with circular cross sections in preference to rectangular or flat surfaces.

Obviously many modifications and variations of the present invention are possible in the light of the above teachings. It is therefore to be understood that within the scope of the appended claims the invention may be practiced otherwise than as specifically described.

What is claimed is:

1. In a ramjet missile having a fuselage and in the aft section of the missile a combustion chamber comprising; a tubular duct circumferentially spaced and supported from the downstream section of the ramjet missile to form an annular cavity therebetween, an elongated circular airfoil diverter spaced within said annular cavity, said diverter being so positioned within the cavity that its leading edge extends forwardly beyond the leading edge of the duct to segregate an entering air mass into layers of air, one of said layers contiguous with said missile being confined within said diverter, and a second layer formed a suitable distance from the missile and confined to flow through an annular cavity formed between said duct and the outside of said diverter, the downstream portion of said annular cavity formed by the duct and diverter forming a combustion chamber having fuel injection nozzles positioned on the outer face of the diverter, an inlet baffle member slidably disposed within said duct at the upstream end thereof and having an inwardly turned leading edge for selectively varying the flow of air into the cavity formed between said duct and the outside of the diverter as the baffle member is moved longitudinally within the duct, means including a plurality of hydraulically operated devices carried by said duct and connected to the inlet baffle member for moving said baffle member longitudinally within said duct a flame holder and pilot nozzle suitably displaced downstream from said nozzles, a movable rod supported by the aft end of the fuselage and disposed within said diverter, a flared tubular trailing section connected to said rod and engaging and movable longitudinally by said rod and within said diverter and extendible beyond said duct to selectively vary the area of the combustion chamber exhaust orifice from between the downstream section of the duct and the periphery of the trailing section, a plurality of struts carried by the flared section for connecting the rod to the section, and a hydraulically operated device operatively connected to said rod for moving the rod.

2. In combination with a ramjet missile, a combustion chamber comprising; a duct circumferentially spaced and supported from the missile to form an elongated annular cavity therebetween, baffle means telescopically disposed in the leading edge of said duct and having an inwardly turned edge for varying the fluid flow into said cavity longitudinally within said duct, means including a plurality of hydraulically operated devices carried by said duct and connected to said baffle means for moving the baffle means longitudinally within the duct, diverter means supportingly spaced intermediate said cavity and projecting rearwardly from a point forward of said baffle mean to form an inner and an outer chamber, said inner chamber being so located as to admit flow of incoming air adjacent said missile and said outer chamber spaced as to admit fluid flow spaced from said missile, said outer chamber having a fuel injection system and means for supporting flame stability, said inner chamber forming a central core through said outer chamber to permit axial flow of additional inlet air to cool said outer chamber, outwardly flared shroud means telescopically movable in said diverter means at the trailing end thereof controlling the discharge area of said outer chamber from which exhaust combustible products emerge an actuating rod movably mounted at the trailing end of the missile and connected to said flared shroud means for moving the flared shroud means, a plurality of struts carried by said flared shroud means for connecting the shroud means to the actuating rod, and hydraulically operated devices carried by the missile and operatively connected to said actuating rod for actuating the rod.

3. A combustion chamber for a ramjet engine comprising; a cylindrical duct circumferentially spaced from the downstream section of an elongated enclosed ramjet body such that the body extends forwardly from the duct, said duct and said ramjet body forming an annular chamber therebetween, an elongated circular airfoil diverter circumferentially spaced intermediate and concentric with said duct and body to form concentric annular cavities, the leading edge of the diverter positioned closely adjacent the leading edge of said duct, the surface of said diverter forming the inner cavity being so positioned as to divide off from an inlet air mass a low energy level fluid layer confined adjacent to said ramjet body, the diverter surface providing the outer cavity being so located as to admit a higher energy level fluid layer, an inlet baffle member slidably disposed within the duct at the upstream end thereof and having an aerodynamically curved leading edge for selectively varying the flow of air into the outer cavity as the baffle member is moved longitudinally within said duct, means including a plurality of hydraulically operated devices carried by the duct and operatively connected to the baffle member for moving the baffle member longitudinally within the duct, fuel injection means mounted downstream on said diverter within the outer cavity, flame supporting means suitably spaced on said diverter from the fuel injection means, an articulated flared tail section in axial alignment with and movably supported on said diverter and extendible beyond the exhaust end of said duct for controlling the outlet area of the outer cavity of said chamber, an actuating rod movably mounted in the trailing end of said body and connected to said flared tail section for moving the flared tail section, a plurality of struts carried by the flared tail section for connecting the tail section to the actuating rod, and hydraulically operated means carried by said body at the trailing end thereof and operatively connected to the actuating rod for moving the actuating rod.

References Cited in the file of this patent

UNITED STATES PATENTS

| 2,483,401 | Cole | Oct. 4, 1949 |
| 2,503,973 | Smith | Apr. 11, 1950 |
| 2,510,506 | Lindhagen et al. | June 6, 1950 |
| 2,540,594 | Price | Feb. 6, 1951 |
| 2,596,435 | Robert | May 13, 1952 |
| 2,612,748 | Tenney et al. | Oct. 7, 1952 |
| 2,675,196 | Marnay | Apr. 13, 1954 |
| 2,720,754 | Francois | Oct. 18, 1955 |

FOREIGN PATENTS

| 607,686 | Great Britain | Sept. 3, 1948 |